(12) United States Patent
Lee et al.

(10) Patent No.: US 8,861,874 B2
(45) Date of Patent: Oct. 14, 2014

(54) APPARATUS AND METHOD OF ENCODING 3D IMAGE

(75) Inventors: Jin Young Lee, Ansan-si (KR); Du Sik Park, Suwon-si (KR); Ho Cheon Wey, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 571 days.

(21) Appl. No.: 13/096,356

(22) Filed: Apr. 28, 2011

(65) Prior Publication Data

US 2011/0280491 A1    Nov. 17, 2011

(30) Foreign Application Priority Data

May 11, 2010  (KR) .......................... 10-2010-0043812

(51) Int. Cl.
*G06K 9/36*        (2006.01)
(52) U.S. Cl.
USPC .......................................... 382/232; 382/154
(58) Field of Classification Search
USPC ....................... 382/232–233, 154; 348/42–43; 375/240.12, 240.16, 240.25
See application file for complete search history.

(56) References Cited

U.S. PATENT DOCUMENTS

| | | | | |
|---|---|---|---|---|
| 5,767,898 | A * | 6/1998 | Urano et al. | 348/43 |
| 6,430,224 | B1 * | 8/2002 | Naito et al. | 375/240.16 |
| 8,625,918 | B2 * | 1/2014 | Takahashi et al. | 382/251 |
| 2009/0142041 | A1 * | 6/2009 | Nagasawa et al. | 386/124 |
| 2011/0255592 | A1 * | 10/2011 | Sung et al. | 375/240.02 |

FOREIGN PATENT DOCUMENTS

| | | |
|---|---|---|
| KR | 10-2000-0049031 | 7/2000 |
| KR | 10-2005-0061762 | 6/2005 |
| KR | 10-2005-0066400 | 6/2005 |
| KR | 10-2006-0063558 | 6/2006 |
| KR | 10-2009-0040028 | 4/2009 |
| KR | 10-2009-0040032 | 4/2009 |
| KR | 10-2010-0008649 | 1/2010 |

OTHER PUBLICATIONS

Partial European Search Report mailed Nov. 8, 2013 in corresponding European Application No. 11155544.7.
Han Ho et al., "H.264-Based Depth Map Sequence Coding Using Motion Information of Corresponding Texture Video", Advances in Image and Video Technology Lecture Notes in Computer Science, 2006, pp. 898-907.
D. V. S. X. De Silva et al., "Intra Mode Selection for Depth Map Coding to Minimize Rendering Distortions in 3D Video", IEEE Transactions on Consumer Electronics, vol. 55, No. 4, Nov. 1, 2009, pp. 2385-2393.
Krzysztof Klimaszewski et al. "Joint Intra Coding of Video and Depth Maps", The International Conference on Signals and Electronic Systems, ICSES 2010, Sep. 7, 2010, pp. 111-114.
Jing Xu et al., "A Joint Coding Method of Video Plus Depth Based on H. 264", The International Conference on Signal Processing, ICSP 2010 Proceedings, Oct. 24, 2010, pp. 1153-1156.

* cited by examiner

*Primary Examiner* — Ishrat I Sherali
(74) *Attorney, Agent, or Firm* — Staas & Halsey LLP

(57)     ABSTRACT

Disclosed is a three-dimensional (3D) image encoding apparatus. The 3D image encoding apparatus includes a first compressed information generation unit to generate first compressed information used to encode one image of two types of images to form a 3D image and a second compressed information generation unit to generate second compressed information used to encode another one image using the first compressed information.

31 Claims, 16 Drawing Sheets

APPARATUS AND METHOD OF ENCODING 3D IMAGE

CROSS-REFERENCE TO RELATED APPLICATIONS

This application claims the priority benefit of Korean Patent Application No. 10-2010-0043812, filed on May 11, 2010, in the Korean Intellectual Property Office, the disclosure of which is incorporated herein by reference.

BACKGROUND

1. Field

One or more embodiments relate to an apparatus and method of encoding a three-dimensional (3D) image, and more particularly, to an apparatus and method of encoding one image using compressed information of another one image of two images to form a 3D image.

2. Description of the Related Art

A stereoscopic image is a three-dimensional (3D) image which provides visual information about depth and space at the same time. Here, unlike stereoscopy that presents a different viewpoint image to each eye, in order to provide an image as perceived from a different aspect whenever a viewpoint of a viewer changes, an image taken from a different viewpoint is needed. Applications using an image taken from a different aspect include a free-viewpoint TV scheme, a 3D TV scheme, etc. A free-viewpoint TV scheme allows a user to optionally change a viewpoint on an object by acquiring multi-viewpoint images of the same scene and analyzing the images. A 3D TV presents a different image to each eye, allowing a viewer to perceive virtual 3D depth. However, an image taken from different viewpoints includes a massive amount of data, and thus it is difficult to secure a network infrastructure and a ground-wave bandwidth when compressing and transmitting the image.

Instead of compressing and transmitting all images from different viewpoints, a depth image is generated and compressively transmitted along with images from part of the viewpoints, thereby reducing an amount of data to be compressed. A depth image is an image to represent a distance between a viewer and an object in a color image as a value of 0 to 255, and thus characteristics thereof are similar to those of a color image.

SUMMARY

According to an aspect of one or more embodiments, there may be provided a three-dimensional (3D) image encoding apparatus, the apparatus including a first encoder to generate first compressed information in a first image macroblock (MB) which is one of images to form a 3D image, and to encode the first image MB using the first compressed information; and a second encoder to generate second compressed information using the first compressed information, and to encode a second image MB which is another one of the images to form the 3D image using the second compressed information.

Here, the first image MB may be one of a color image MB and a depth image MB, and the second image MB may be another one of the color image MB and the depth image MB which is different from the first image MB.

Here, the first compressed information may be a first image intra prediction mode (IPM) which represents an IPM of the first image MB, and the second compressed information may be a second image IPM to represent an IPM of the second image MB.

Here, the first encoder may include a first image intra prediction unit to respectively generate prediction blocks according to IPMs, and a first image IPM determination unit to examine a compression efficiency by differentiating the first image MB by the prediction blocks and rate-distortion optimizing a differentiation result and to determine an IPM having superior or relatively high compression efficiency among the IPMs as the first image IPM.

Here, the second encoder may include a second image IPM determination unit to determine the first image IPM as the second image IPM that is the IPM of the second image MB.

Here, the second encoder may include a candidate IPM generation unit to generate candidate IPMs using the first image IPM; a second image intra prediction unit to respectively generate candidate prediction blocks according to the candidate IPMs; and a second image IPM determination unit to examine a compression efficiency by differentiating the second image MB by the candidate prediction blocks and rate-distortion optimizing a differentiation result, and to determine a candidate IPM having superior compression efficiency among the candidate IPMs as the second image IPM.

Here, the first compressed information may be a first image motion vector (MV) to represent an MV of the first image MB, and the second compressed information may be a second image MV to represent an MV of the second image MB.

Here, the first encoder may include a first image predictive MV (PMV) calculation unit to calculate a first image PMV which represents a PMV of the first image MB using the first image MB and adjacent blocks; and a first image motion explorer to generate the first image MV that is a final MV of the first image MB by motion exploration in a first image based on the first image PMV.

Here, the second encoder may include a second image MV determination unit to determine the first image MV as the second image MV that is a final MV of the second image MB.

Here, the second encoder may include a second image motion explorer to generate the second image MV that is a final MV of the second image MB by motion exploration in a second image based on the first image MV.

Here, the second encoder may include a second image first motion explorer to generate a second image first MV which is one of candidate MVs of the second image MB by motion exploration in a second image based on the first image MV; a second image PMV calculation unit to calculate a second image PMV which represents a PMV of the second image MB using the second image MB block and adjacent blocks; a motion explorer to generate a second image second MV which is one of the candidate MVs of the second image MB by motion exploration in the second image based on the second image PMV; and a second image MV selection unit to select an MV having a minimum or relatively low motion cost function as the second image MV by comparing the second image first MV with the second image second MV.

According to an aspect of one or more embodiments, there may be provided a 3D image decoding apparatus, the apparatus including a first decoder to decode an encoded first image MB using first compressed information when receiving the encoded first image MB which is one of images to form a 3D image and the first compressed information; and a second decoder to generate second compressed information using the first compressed information and to decode an encoded second image MB using the second compressed information when receiving the encoded second image MB which is another one of the images to form the 3D image.

Here, the first image MB may be one of a color image MB and a depth image MB, and the second image MB may be another one of the color image MB and the depth image MB which is different from the first image MB.

Here, the first compressed information may be a first image IPM to represent an IPM of the first image MB, and the second compressed information may be a second image IPM to represent an IPM of the second image MB.

Here, the first decoder may receive the first image IPM along with the encoded first image MB and decode the encoded first image MB using the first image IPM.

Here, the second decoder may receive the encoded second image MB and decode the encoded second image MB using the first image IPM.

Here, the second decoder may receive an index bit along with the encoded second image MB, generate candidate IPMs using the first image IPM, and decode the encoded second image MB using a candidate IPM corresponding to the index bit among the candidate IPMs as the second image IPM.

Here, the first compressed information may be a first image MV which represents an MV of the first image MB, and the second compressed information may be a second image MV which represents an MV of the second image MB.

Here, the first decoder may receive the first image MV along with the encoded first image MB and decode the encoded first image MB using the first image MV.

Here, the second decoder may receive the encoded second image MB and decode the encoded second image MB using the first image MV.

Here, the second decoder may receive the encoded second image MB, reconstruct the second image MV using the first image MV as a second image PMV, and decode the encoded second image MB using the second image MV.

Here, the second decoder may receive the encoded second image MB and an index bit; and the second decoder may reconstruct the second image MV using the first image MV as a second image PMV and decode the encoded second image MB using the second image MV when either the index bit indicates the first image MV is the second image PMV, or the second decoder may decode the encoded second image MB using the second image MV received along with the encoded second image MB when the index bit indicates that the second PMV is calculated through the second image MB.

According to an aspect of one or more embodiments, there may be provided a 3D image encoding method, the method including generating first compressed information in a first image MB which is one of images to form a 3D image and encoding the first image MB using the first compressed information; and generating second compressed information using the first compressed information and encoding a second image MB which is another one of the images to form the 3D image using the second compressed information.

Here, the first image MB may be one of a color image MB and a depth image MB, and the second image MB may be another one of the color image MB and the depth image which is different from the first image MB.

Here, the first compressed information may be a first image IPM to represent an IPM of the first image MB, and the second compressed information may be a second image IPM to represent an IPM of the second image MB.

Here, the generating of the first compressed information may include respectively generating prediction blocks according to IPMs; examining a compression efficiency by differentiating the first image MB by the prediction blocks and rate-distortion optimizing the first image MB; and determining an IPM having superior or relatively high compression efficiency among the IPMs as the first image IPM.

Here, the generating of the second compressed information may include determining the first image IPM as the second image IPM that is an IPM of the second image MB.

Here, the generating of the second compressed information may include generating candidate IPMs using the first image IPM; respectively generating candidate prediction blocks according to the candidate IPMs; examining a compression efficiency by differentiating the second image MB by the candidate prediction blocks and rate-distortion optimizing the second image MB; and determining a candidate IPM having superior or relatively high compression efficiency among the candidate IPMs as the second image IPM.

Here, the first compressed information may be a first image MV which represents an MV of the first image MB, and the second compressed information may be a second image MV which represents an MV of the second image MB.

Here, the generating of the first image PMV that is the first compressed information may include calculating the first image PMV which represents a PMV of the first image MB using the first image MB and adjacent blocks, and generating the first image MV that is a final MV of the first image MB by motion exploration of a first image.

Here, the generating of the second image PMV that is the second compressed information may include determining the first image MV as the second image MV that is a final MV of the second image MB.

Here, the generating of the second image PMV that is the second compressed information may include generating the second image MV that is a final MV of the second image MB by motion exploration of a second image based on the first image MV.

Here, the generating of the second image PMV that is the second compressed information may include generating a second image first MV which is one of candidate MVs of the second image MB by motion exploration of a second image based on the first image MV; calculating a second image PMV which represents a PMV of the second image MB using the second image MB and adjacent blocks; generating a second image second MV which is one of the candidate MVs of the second image MB by motion exploration of the second image based on the second PMV; and selecting an MV having a minimum or relatively low motion cost function as the second image MV by comparing the second image first MV and the second image second MV.

According to an aspect of one or more embodiments, there may be provided a 3D image decoding method, the method including receiving an encoded first image MB which is one of images to form a 3D image and a first compressed information; decoding the encoded first image MB using the first compressed image; receiving an encoded second image MB which is another one of the images to form the 3D image; generating second compressed information using the first compressed information; and decoding the encoded second image MB using the second compressed information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
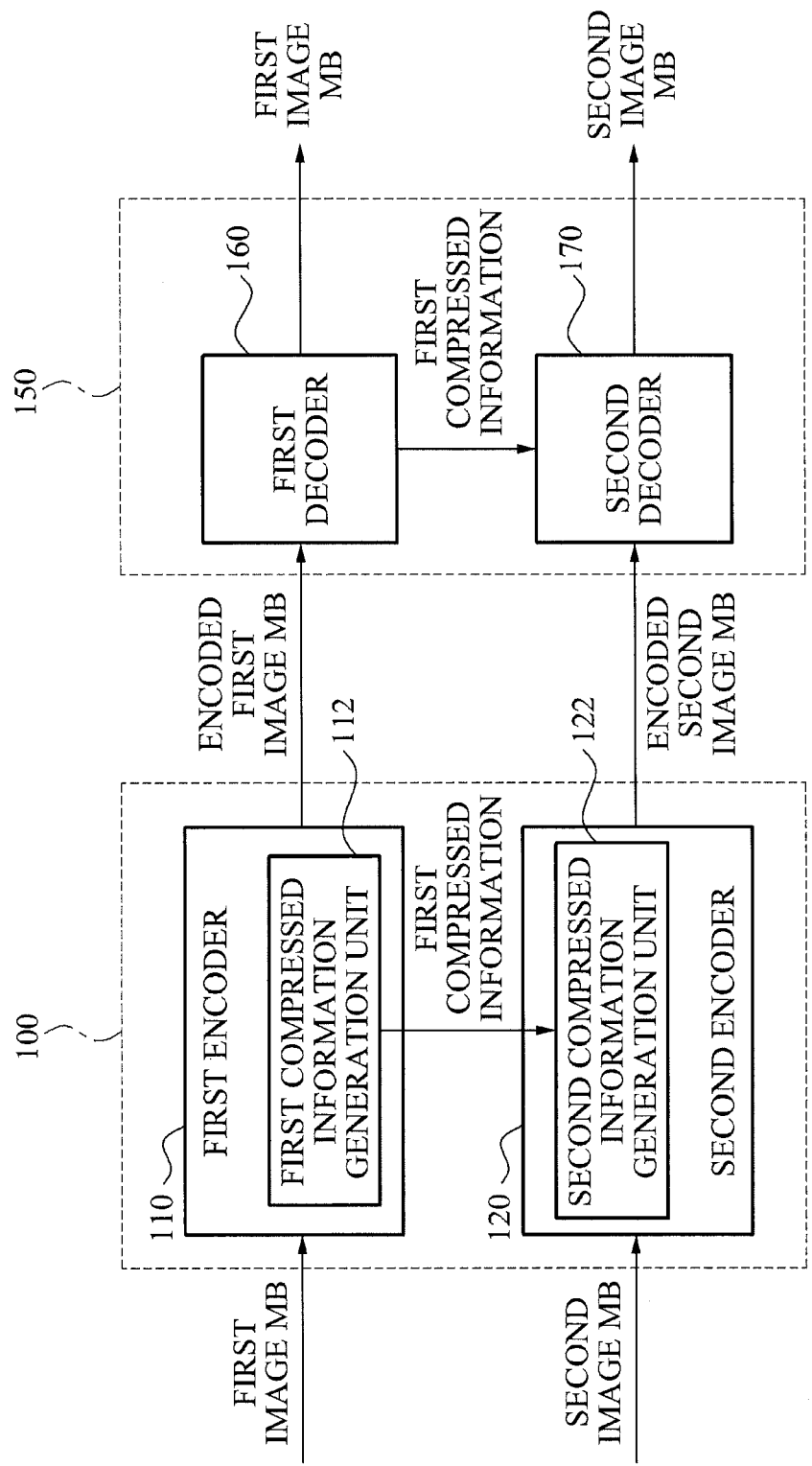
FIG. 1 illustrates an example of a system of encoding and decoding a 3D image according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an example of a system of encoding and decoding a 3D image according to an embodiment.

Referring to FIG. 1, a 3D image system may include a 3D image encoding apparatus 100 to encode a 3D image formed of a color image and a depth image and a 3D image decoding apparatus 150 to decode an encoded 3D image.

The 3D image encoding apparatus 100 may include a first encoder 110 and a second encoder 120.

The first encoder 110 may include a first compressed information generation unit 112 to generate first compressed information in a first image macroblock (MB) which is one of images to form a 3D image, and encodes the first image MB using the first compressed information. Here, the first image MB may be one of a color image MB and a depth image MB. The first compressed information may be a first image intra prediction mode (IPM) to represent an IMP of the first image MB, or a first image motion vector (MV) to represent an MB of the first image MB.

The second encoder 120 may include a second compressed information generation unit 122 to generate second compressed information using the first compressed information, and encodes a second image MB which is another one of the images to form the 3D image using the second compressed information. Here, the second image MB is another one of the color image MB and the depth image MB which is different from the first image MB. The second compressed information may be a second image IPM to represent an IMP of the second image MB or a second image MV to represent an MV of the second image MB.

The 3D image decoding apparatus 150 may include a first decoder 160 and a second decoder 170.

The first decoder 160 receives an encoded first image MB, identifies first compressed information in the encoded first image MB, and decodes the encoded first image MB using the first compressed information.

The second decoder 170 receives an encoded second image MB, generates second compressed information using the first compressed information received from the first decoder 160, and decodes the encoded second image MB using the second compressed information.

When the compressed information is an IPM, a configuration of the first compressed information generation unit 112 and the second compressed information generation unit 122 which generate an IPM are described below with reference to FIGS. 2 and 3.

Figure 2:
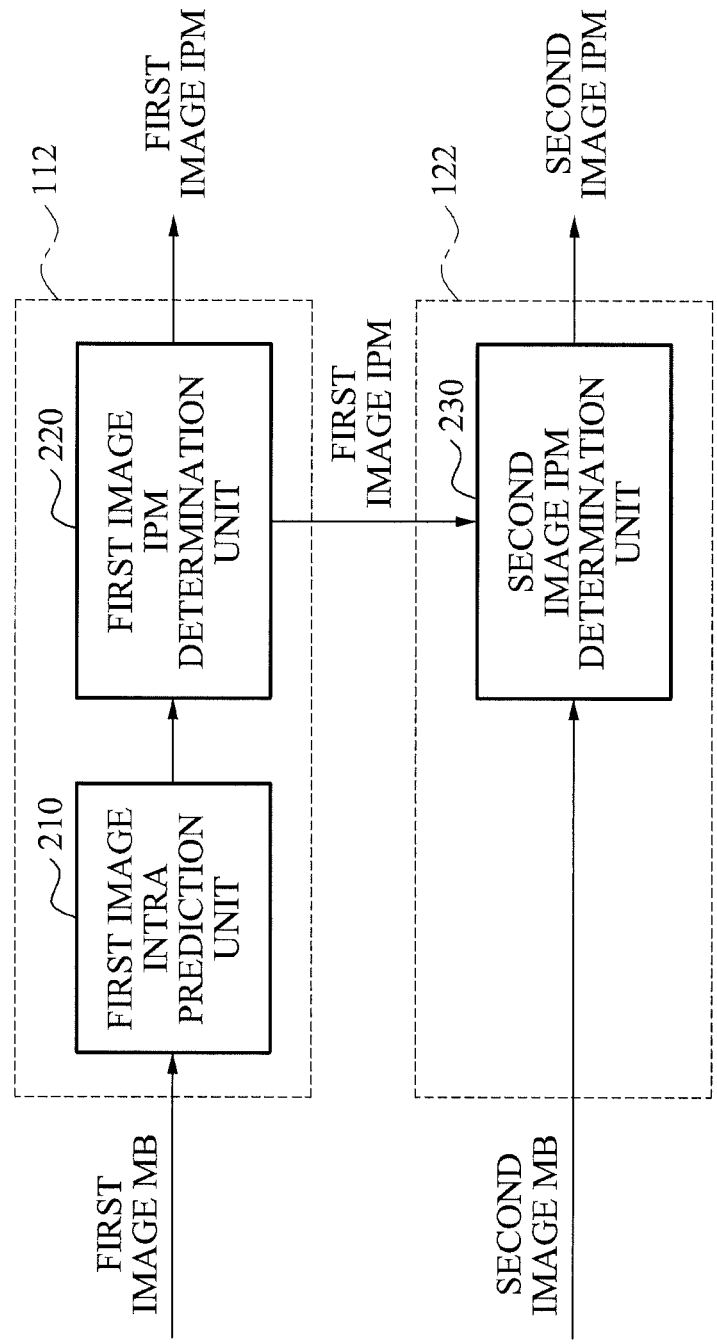
FIG. 2 illustrates an example of an apparatus of generating an intra prediction mode of a color image and a depth image.

FIG. 2 illustrates an example of an apparatus of generating an IPM of a color image and a depth image.

Referring to FIG. 2, the first compressed information generation unit 112 includes a first image intra prediction unit 210 and a first image IPM determination unit 220, and the second compressed information generation unit 122 includes a second image IPM determination unit 230.

Figure 4:
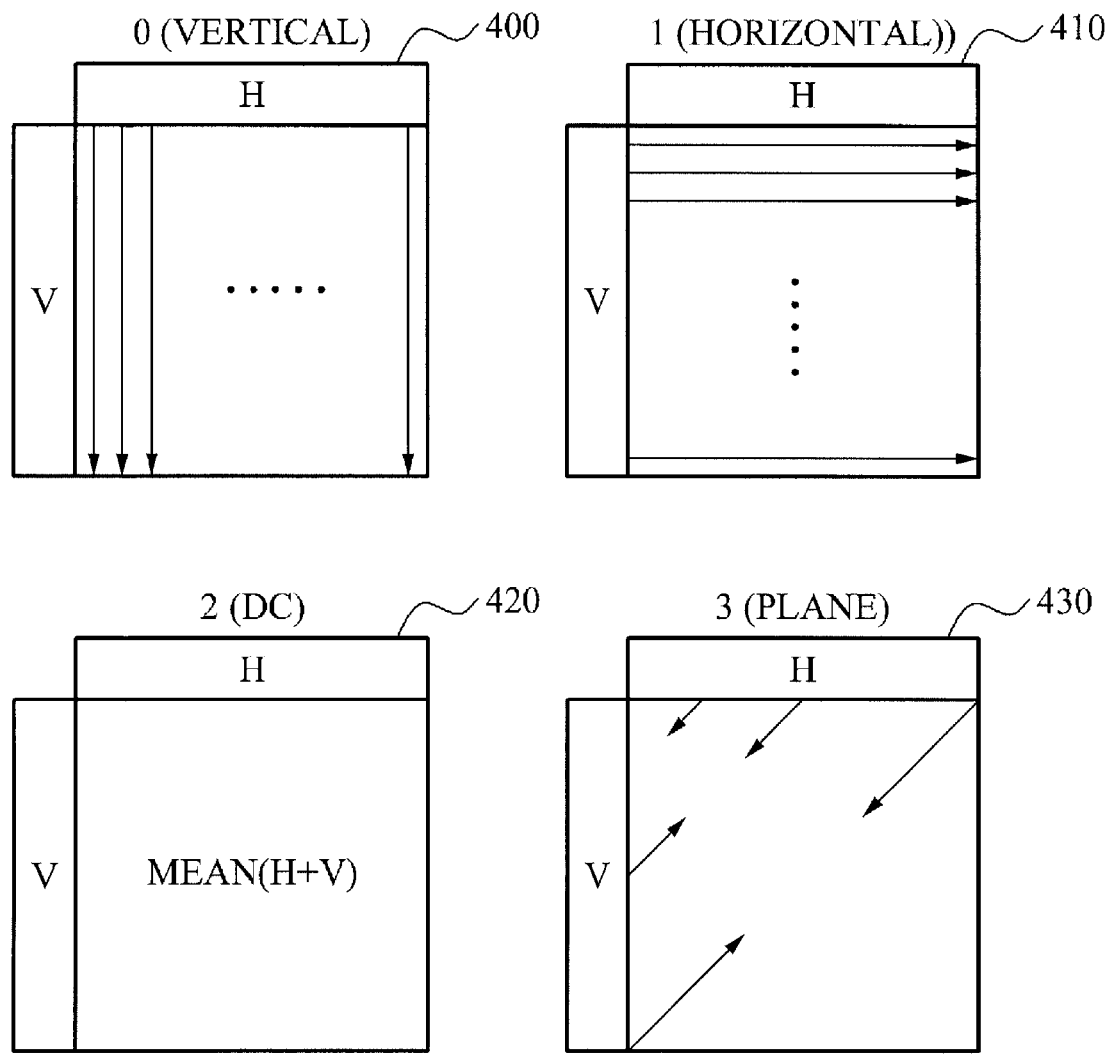
FIG. 4 illustrates four modes of an intra 16×16 mode according to example embodiments.
Figure 5:
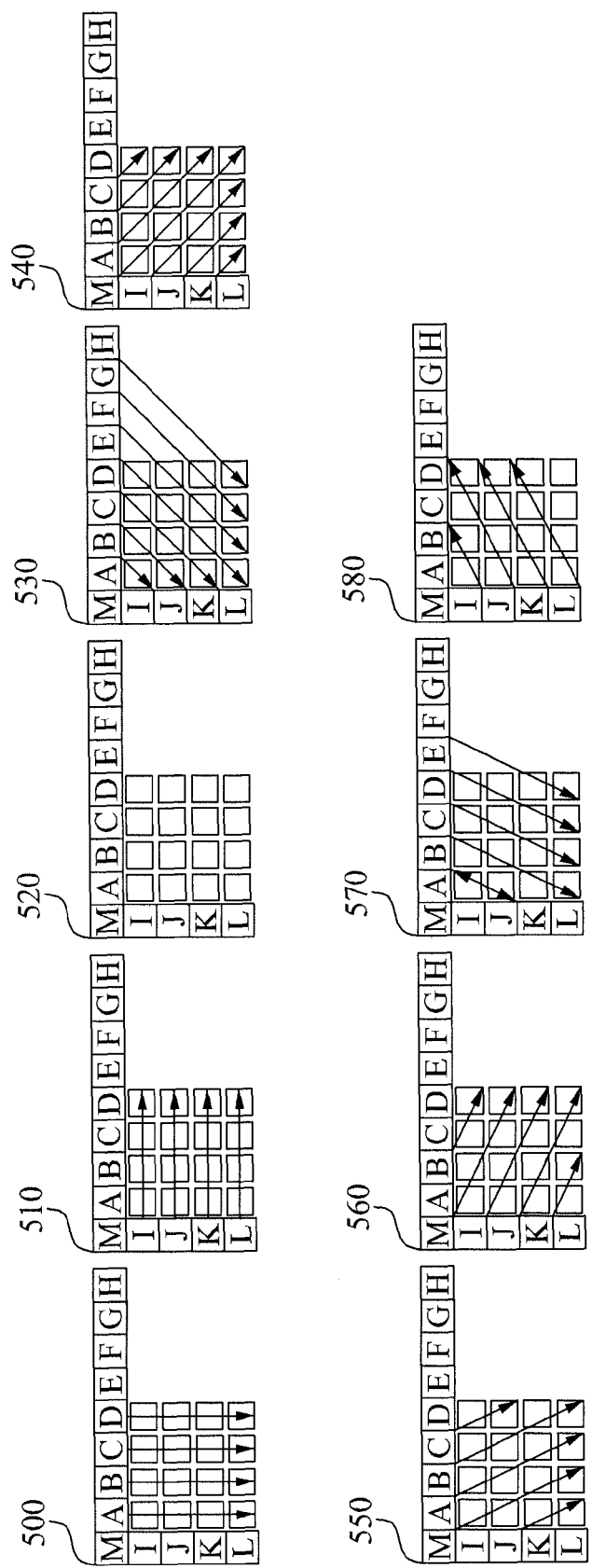
FIG. 5 illustrates nine modes of an intra 4×4 mode according to example embodiments.

The first image intra prediction unit 210 generates predication blocks from boundary pixels of the first image MB according to IPMs, respectively. Here, when the first image MB is 16×16, four IPMs may be used, as shown in FIG. 4. When the first image MB is 4×4, nine IPMs may be used, as shown in FIG. 5.

FIG. 4 illustrates four modes of an intra 16×16 mode according to example embodiments.

Referring to FIG. 4, the four modes of the intra 16×16 mode may include a mode 0 400 to a mode 3 430.

The mode 0 (vertical mode) 400 generates a prediction block vertically using an upper boundary pixel. The mode 1 (horizontal mode) 410 generates a prediction pixel horizontally using a left boundary pixel to generate a prediction block. The mode 2 (DC mode) 420 generates a prediction block using a mean of the upper boundary pixel and the left boundary pixel. The mode 3 (plane mode) 430 generates a prediction block based on the upper boundary pixel and the left boundary pixel.

FIG. 5 illustrates nine modes of an intra 4×4 mode according to example embodiments.

Referring to FIG. 5, the nine modes of the infra 4×4 mode may include a mode 0 500 to a mode 8 580. As shown in FIG. 5, the mode 0 500 generates prediction blocks vertically using upper boundary pixels A, B, C, and D. A mode 1 510 generates prediction blocks horizontally using left boundary pixels I, J, K, and L. A mode 2 520 generates prediction blocks using respective means of the upper boundary pixels A, B, C, and D and the left boundary pixels I, J, K, and L. A mode 3 530 generates prediction blocks by interpolation of boundary pixels at 45 degrees from a right upper end to a lower left end. A mode 4 540 generates prediction blocks by expansion of boundary blocks at 45 degrees to a lower right end. A mode 5

550 generates prediction blocks by expansion of boundary blocks at about 26.6 degrees to a right of a vertical line. A mode 6 560 generates prediction blocks by expansion of boundary pixels at about 26.6 degrees to a lower direction of a horizontal line. A mode 7 570 generates prediction blocks by expansion of boundary pixels at about 26.6 degrees to a left of the vertical line. The mode 8 580 generates prediction blocks by interpolation of boundary pixels at about 26.6 degrees to an upper direction of the horizontal line.

The first image IPM determination unit 220 differentiates the first image MB by the prediction blocks and rate-distortion optimizes a differentiation result to examine a compression efficiency, and determines an IPM having relatively high compression efficiency among the IPMs as a first image IPM.

The second image IPM determination unit 230 determines the first image IPM as a second image IPM.

As shown in FIG. 2, when the second compressed information generation unit 122 determines the first image IPM as the second image IPM, the first encoder 110 transmits the first image IPM together with an encoded first image MB to the first decoder 160 (shown in FIG. 1).

The first decoder 160 of the 3D image decoding apparatus 150 decodes an encoded first image MB using the first image IPM and provides the first image IPM to the second decoder 170. The second decoder 170 receives an encoded second image MB from the second encoder 120 and decodes the encoded second image MB using the first image IPM provided from the first decoder 160.

Thus, the second encoder 120 may not need to transmit the second image IPM when transmitting the encoded second image MB.

Figure 3:
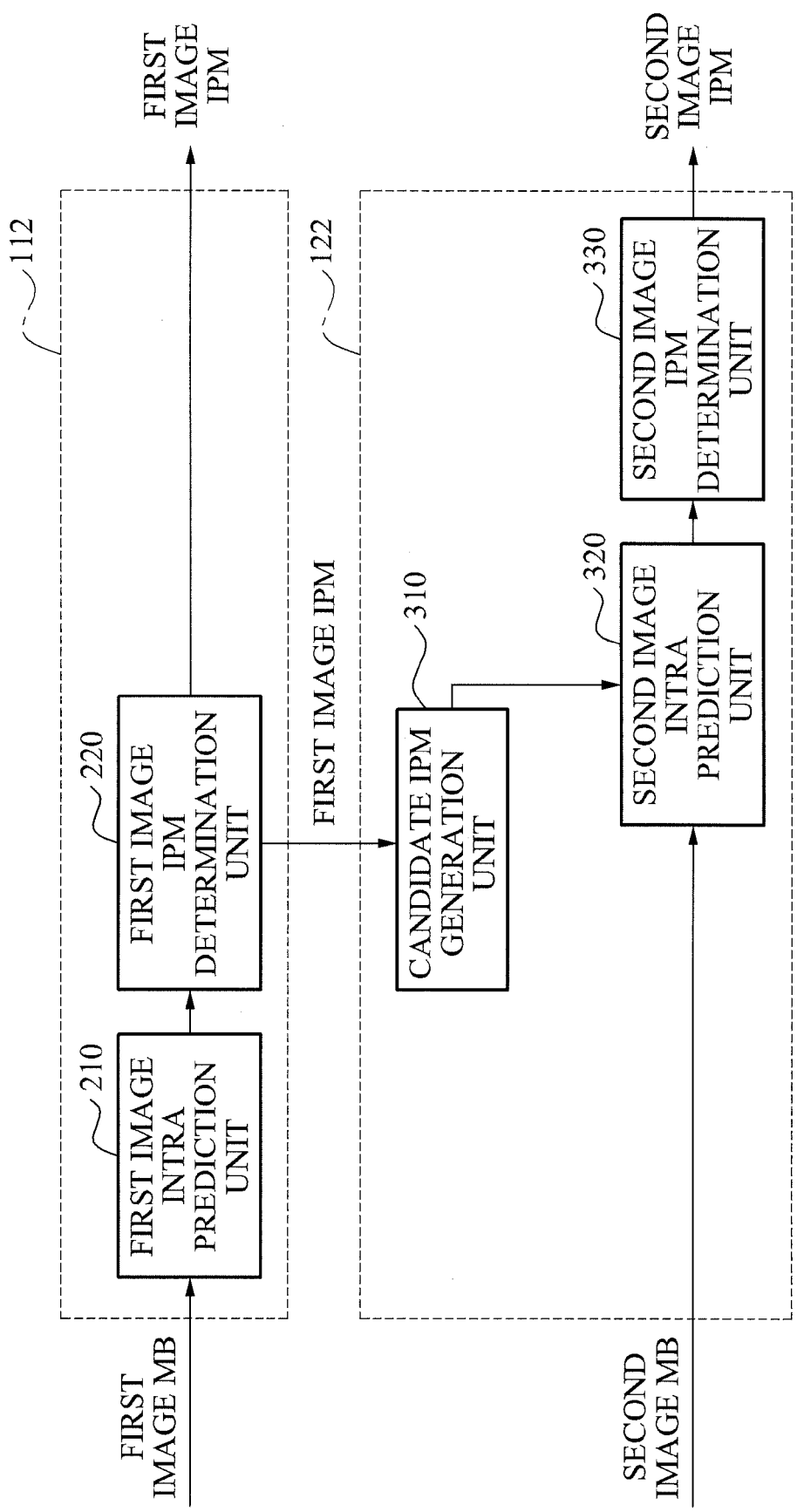
FIG. 3 illustrates another example of the apparatus of generating the intra prediction mode of the color image and the depth image.

FIG. 3 illustrates another example of the apparatus of generating the IPM of the color image and the depth image.

Referring to FIG. 3, the first compressed information generation unit 112 may include the first image intra prediction unit 210 and the first image IPM determination unit 220. The second compressed information generation unit 122 may include a candidate IPM generation unit 310, a second image intra prediction unit 320, and a second image IPM determination unit 330.

The candidate IPM generation unit 310 generates candidate IPMs using a first image IPM received from the first image IPM determination unit 220. The candidate IPMs are generated by tilting the first image IPM at a preset angle to either the right or left. Here, a weighted value of boundary pixels of adjacent blocks may vary based on the preset angle.

The second image intra prediction unit 320 generates candidate prediction blocks according to the candidate IPMs, respectively.

The second image IPM determination unit 330 differentiates the second image MB by the candidate prediction blocks and, rate-distortion optimizes a differentiation result to examine a compression efficiency, and determines a candidate IPM having relatively high compression efficiency among the candidate IPMs as a second image IPM.

A configuration of the first compressed information generation unit 112 and the second compressed information generation unit 122 to generate an MV, when the compressed information is an MV, is described below with reference to FIGS. 6 to 8.

As shown in FIG. 1 and FIG. 3, when the second compressed information generation unit 122 generates the candidate IPMs using the first image IPM and determines the second image IPM among the candidate IPMs, the first encoder 110 transmits the first image IPM along with the first image MB to the first decoder 160. Then, the second encoder 120 transmits an index bit to represent the second image IPM along with the encoded second image MB to the second decoder 170.

The first decoder 160 of the 3D image decoding apparatus 150 decodes the encoded first image MB using the first image IPM and provides the first image IPM to the second decoder 170. The second decoder 170 receives the encoded second image MB and the index bit from the second encoder 120. The second decoder 170 generates candidate IPMs using the first image IPM provided from the first decoder 160 and identifies a candidate IPM corresponding to the index bit among the candidate IPMs as the second image IPM. Then, the second decoder 170 decodes the encoded second image MB using the identified second image IPM.

Figure 6:
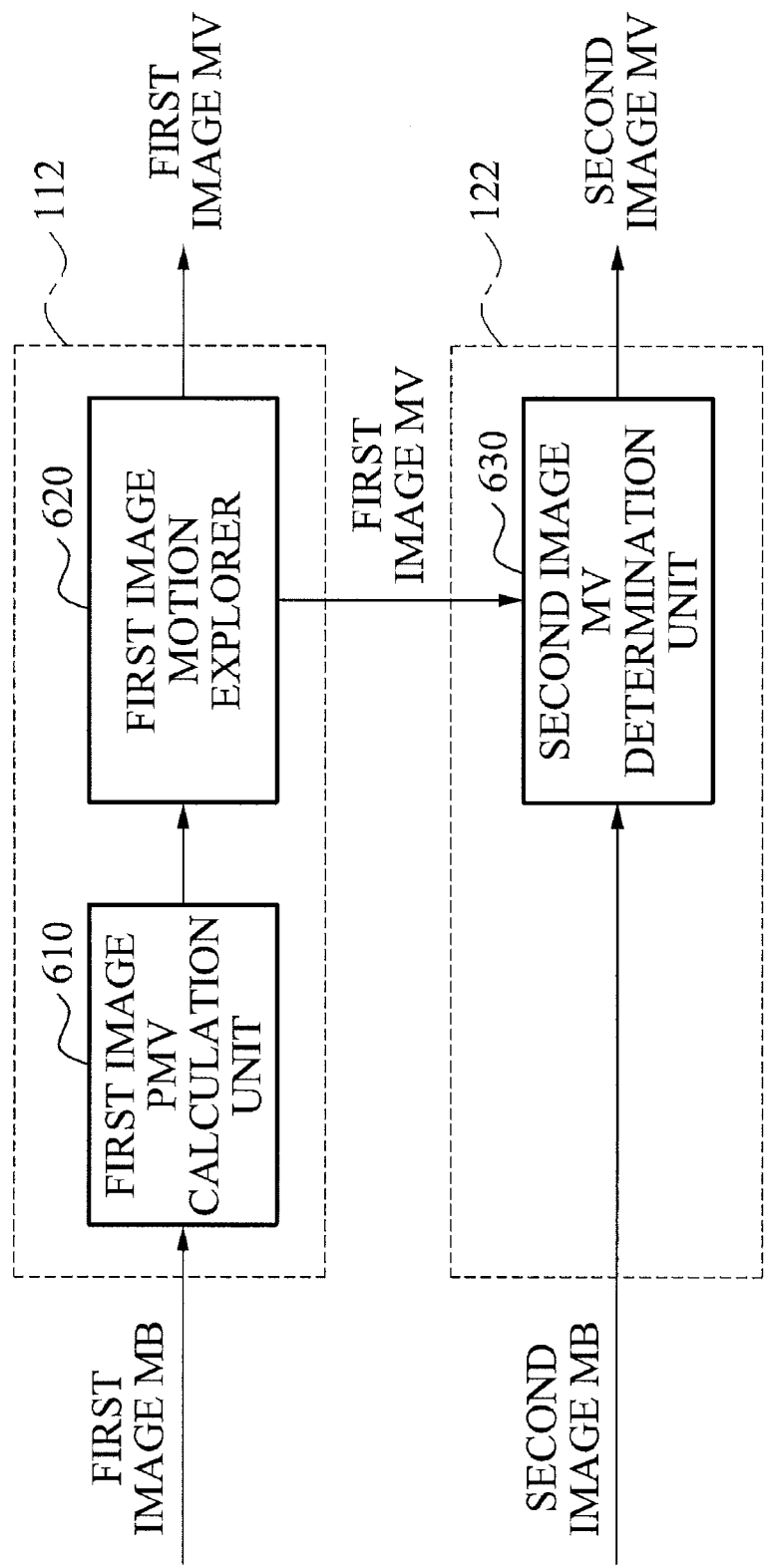
FIG. 6 illustrates an example of an apparatus of generating a motion vector of a color image and a depth image.

FIG. 6 illustrates an example of an apparatus of generating an MV of a color image and a depth image.

Referring to FIG. 6, the first compressed information generation unit 112 includes a first image predictive motion vector (PMV) calculation unit 610 and a first image motion explorer 620, and the second compressed information generation unit 122 includes a second image MV determination unit 630.

The first image PMV calculation unit 610 calculates a first image PMV representing a PMV of the first image MB using the first image MB and adjacent blocks. For example, the first image PMV calculation unit 610 may calculate the first image PMV into a vector obtained by median filters of MVs of left, upper, and right-upper blocks that are the first image MB and the adjacent blocks in horizontal/vertical directions, respectively.

The first image motion explorer 620 explores motion in a first image based on the first image PMV to generate a first image MV that is a final MV of the first image MB.

The second image MV determination unit 630 determines the first image MV as a second image MV.

As shown in FIG. 6, when the second compressed information generation unit 122 determines the first image MV is the second image MV, the first encoder 110 transmits the first image MV along with the encoded first image MB.

The first decoder 160 of the 3D image decoding apparatus 150 decodes the encoded first image MB using the first image MV and provides the first image MV to the second decoder 170. The second decoder 170 receives the encoded second image MB from the second encoder 120 and decodes the encoded second image MB using the first image MV provided from the first decoder 160.

Thus, the second encoder 120 may not need to transmit the second image MV when transmitting the encoded second image MB.

Figure 7:
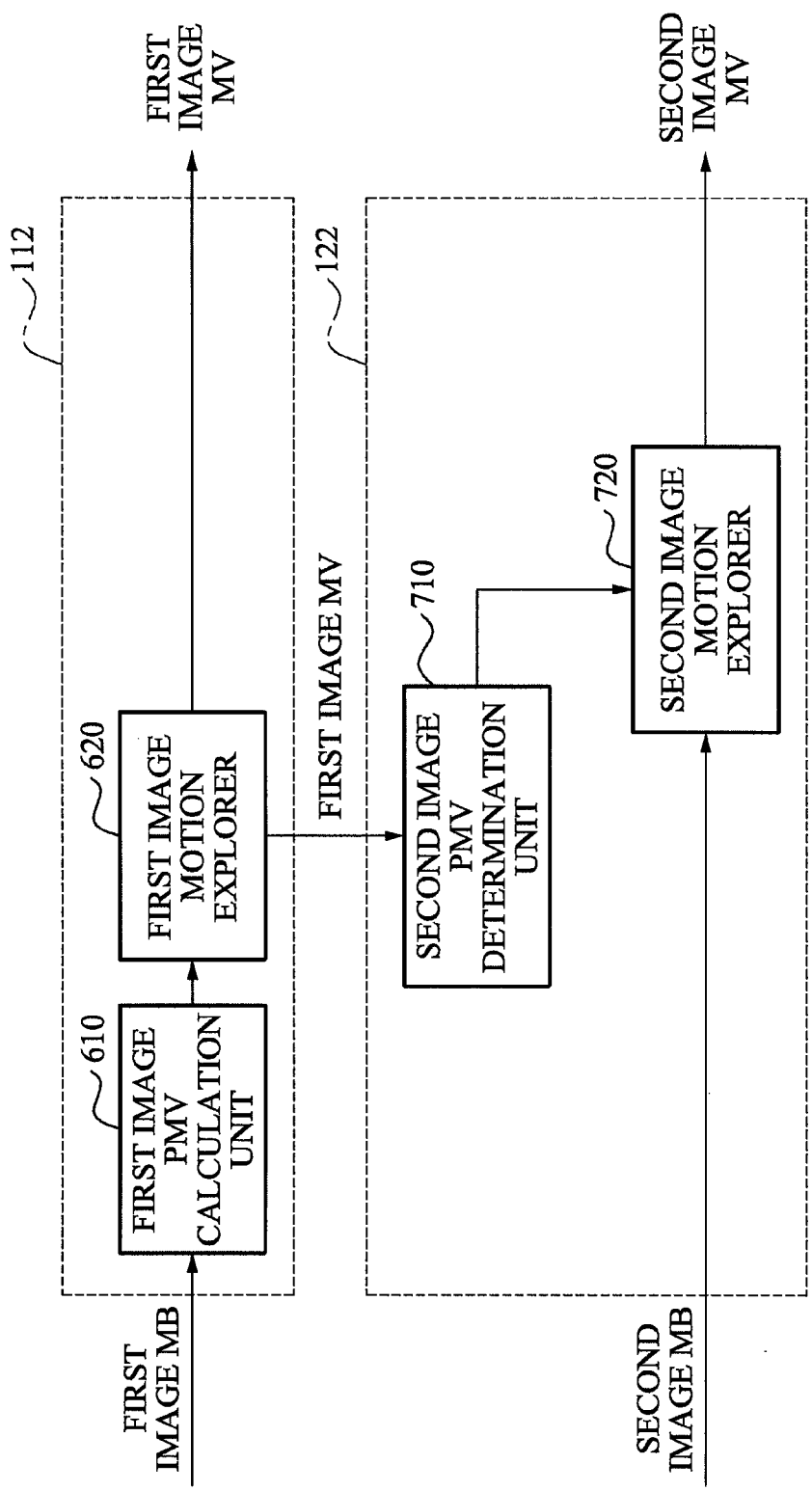
FIG. 7 illustrates another example of the apparatus of generating the motion vector of the color image and the depth image.

FIG. 7 illustrates another example of the apparatus of generating the MV of the color image and the depth image.

Referring to FIG. 7, the first compressed information generation unit 112 includes the first image PMV calculation unit 610 and the first image motion explorer 620, and the second compressed information generation unit 122 includes a second image PMV determination unit 710 and a second image motion explorer 720.

The second image PMV determination unit 710 determines the first image MV as a second image PMV representing a PMV of the second image MB.

The second image motion explorer 720 explores motion in a second image based on the second image PMV determined by the second image PMV determination unit 710 to generate a second image MV that is a final MV of the second image MB.

As shown in FIG. 7, when the second compressed information generation unit 122 determines the first image MV is the second image PMV and determines the second image MV by motion exploration in the second image, the first encoder 110 transmits the first image MV along with the encoded first image MB.

The first decoder 160 of the 3D image decoding apparatus 150 decodes the encoded first image MB using the first image MV and provides the first image MV to the second decoder 170. The second decoder 170 receives the encoded second image MB from the second encoder 120. The second decoder 170 generates the second image PMV using the first image MV provided from the first decoder 60 and reconstructs the second image MV using the second image PMV. Then, the second decoder 170 decodes the encoded second image MB using the second image MV.

Figure 8:
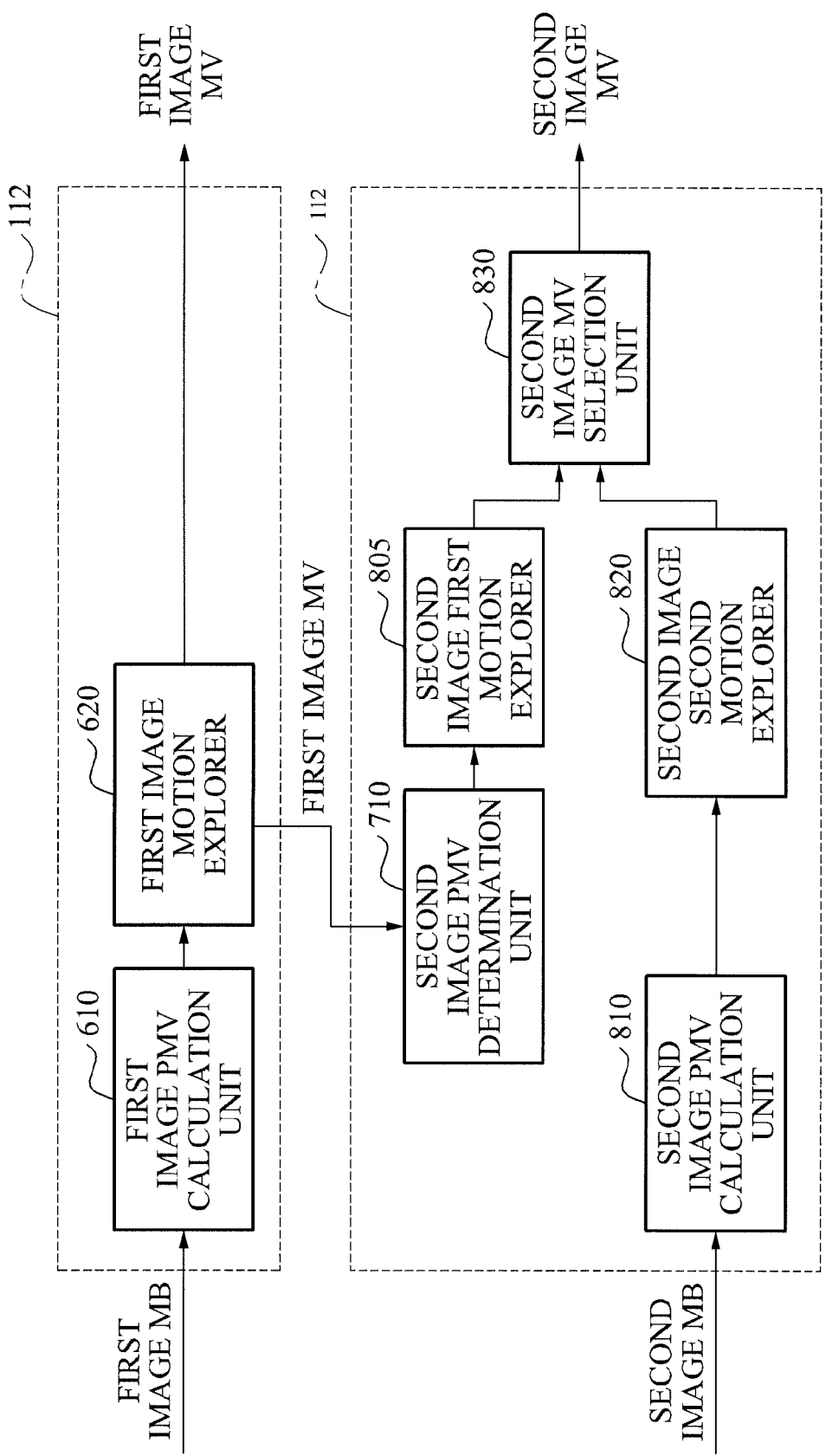
FIG. 8 illustrates still another example of the apparatus of generating the motion vector of the color image and the depth image.

FIG. 8 illustrates still another example of the apparatus of generating the motion vector of the color image and the depth image.

Referring to FIG. 8, the first compressed information generation unit 112 includes the first image PMV calculation unit 610 and the first image motion explorer 620. The second compressed information generation unit 122 includes the second image PMV determination unit 710, a second image first motion explorer 805, a second image PMV calculation unit 810, a second image second motion explorer 820, and a second image MV selection unit 830.

The second image PMV determination unit 710 determines the first image MV as the second image PMV representing the PMV of the second image MB.

The second image first motion explorer 805 explores motion in the second image based on the second image PMV determined by the second image PMV determination unit 710 to generate a second image first MV that is a candidate MV of the second image MB.

The second image PMV calculation unit 810 calculates the second image PMV representing the PMV of the second image MB using the second image MB and adjacent blocks. For example, the second image PMV calculation unit 810 may calculate the second image PMV into a vector obtained by median filter of MVs of left, upper, and upper-right blocks that are the second image MB and the adjacent blocks in horizontal/vertical directions, respectively.

The second image second motion explorer 820 explores motion in the second image based on the second image PMV calculated by the second image PMV calculation unit 810 to generate a second image second MV that is a candidate MV of the second image MB.

The second image MV selection unit 830 compares the second image first MV with the second image second MV and selects an MV having a minimum (or relatively low) motion cost function as the second image MV.

As shown in FIG. 8, when the second compressed information generation unit 122 generates the second image MV and a general scheme or the process as described with reference to FIG. 7 is used, the first encoder 110 transmits the first image MV along with the encoded first image MB.

The second encoder 120 transmits an index bit along with the encoded second image MB. Here, the index bit is information indicating which of a general scheme and the process as described with reference to FIG. 7 the second image MV is generated by.

When the index bit indicates the second image PMV is calculated through the second image MB, that is, the second image MV is generated by a general scheme, the second decoder 170 transmits the index bit and the second image MV along with the second image MB.

The first decoder 160 of the 3D image decoding apparatus 150 decodes the encoded first image MB using the first image MV and provides the first image MV to the second decoder 170.

The second decoder 170 may receive the encoded second image MB and the index bit from the second encoder 120 and further receive the second image MV.

When the index bit indicates that the first image MV is the second image PMV, the second decoder 170 generates the second image PMV using the first image MV provided from the first decoder 160 and reconstructs the second image MV using the second image PMV. Then, the second decoder 170 decodes the encoded second image MB using the second image MV.

However, when the index bit indicates that the second image PMV is calculated through the second image MB, the second decoder 170 decodes the encoded second image MB using the second image MV received along with the encoded second image MB from the second encoder 120.

Hereinafter, a process of encoding a 3D image with the above configuration according to an embodiment is described below with reference to drawings.

Figure 9:
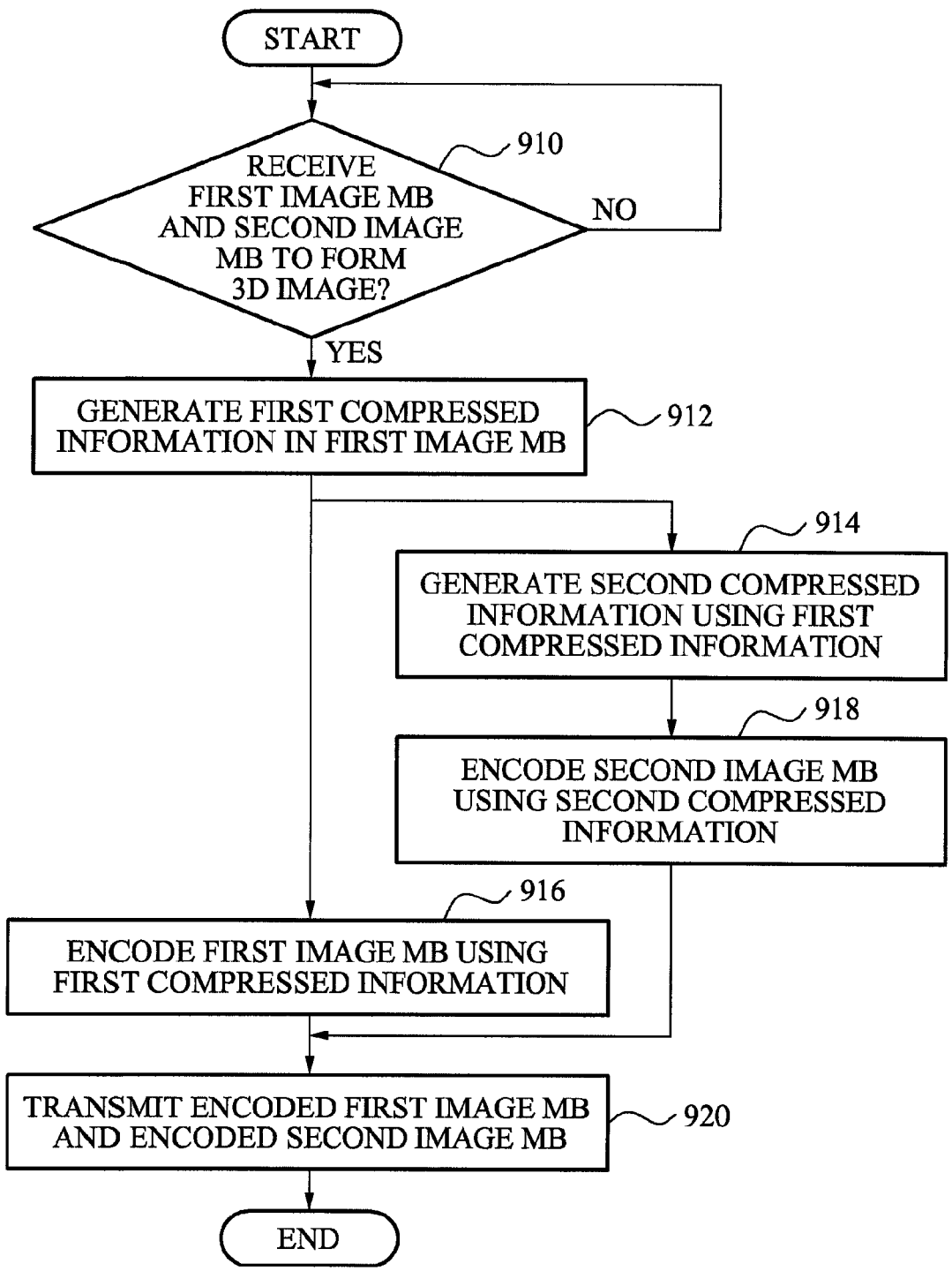
FIG. 9 is a flowchart illustrating a process of encoding a 3D image according to example embodiments.

FIG. 9 is a flowchart illustrating a process of encoding a 3D image according to example embodiments.

Referring to FIG. 9, when the 3D image encoding apparatus 100 receives a first image MB and a second image MB which form a 3D image in operation 910, the 3D image encoding apparatus 100 generates first compressed information in the first image MB in operation 912. Here, the first image MB may be one of a color image MB and a depth image MB. The first compressed information may be a first image IPM representing an IPM of the first image MB or a first image MV representing an MV of the first image MB.

Then, the 3D image encoding apparatus 100 generates second compressed information using the first compressed information in operation 914. Here, the second image MB is another one of the color image MB and the depth image MB which is different from the first image MB. The second compressed information may be a second image IPM representing an IPM of the second image MB or a second image MV representing an MV of the second image MB.

The 3D image encoding apparatus 100 encodes the first image MB using the first compressed information in operation 916. The 3D image encoding apparatus 100 encodes the second image MB using the second compressed information in operation 918. The 3D image encoding apparatus 100 transmits the encoded first image MB and the encoded second image MB to the 3D image decoding apparatus 150 in operation 920.

When the compressed information is an IPM, a process of generating the first image IPM and the second image IPM is described below with reference to FIGS. 10 to 12.

Figure 10:
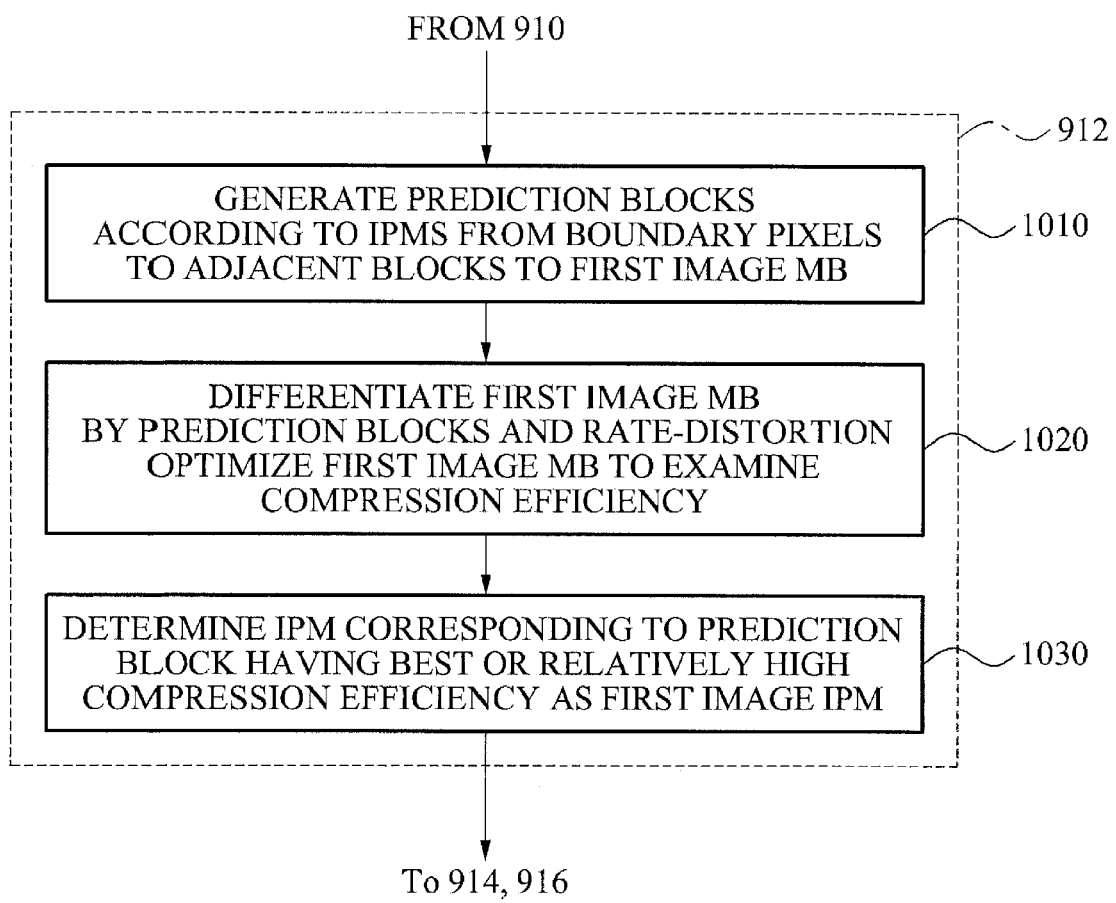
FIG. 10 is a flowchart illustrating a process of generating an intra prediction mode of a color image or a depth image according to example embodiments.

FIG. 10 is a flowchart illustrating a process of generating an IPM of a color image or a depth image according to example embodiments.

Referring to FIG. 10, the first compressed information generation unit 112 generates prediction blocks based on IPMs from boundary pixels to adjacent blocks to the first image MB in operation 1010.

The first compressed information generation unit 112 differentiates the first image MB by the prediction blocks and rate-distortion optimizes the a differentiation result to examine a compression efficiency in operation 1020.

Then, the first compressed information generation unit 112 determines an IPM having relatively high or best compression efficiency among the IPMs as the first image IPM in operation 1030.

Figure 11:
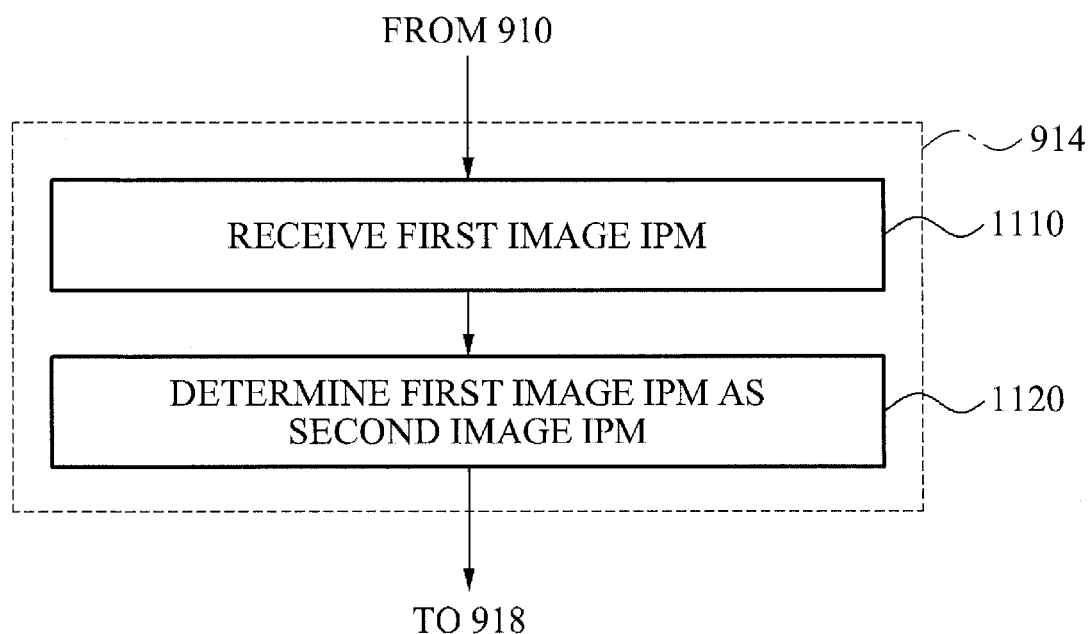
FIG. 11 is a flowchart illustrating an example of generating an intra prediction mode of an image using an intra prediction mode of another image according to example embodiments.

FIG. 11 is a flowchart illustrating an example of generating an IPM of an image using an IPM of another image according to example embodiments.

Referring to FIG. 11, the second compressed information generation unit 122 receives the first image IPM in operation 1110. Then, the second compressed information generation unit 122 determines the first image IPM as the second image IPM that is an IPM of the second image MB in operation 1120.

Figure 12:
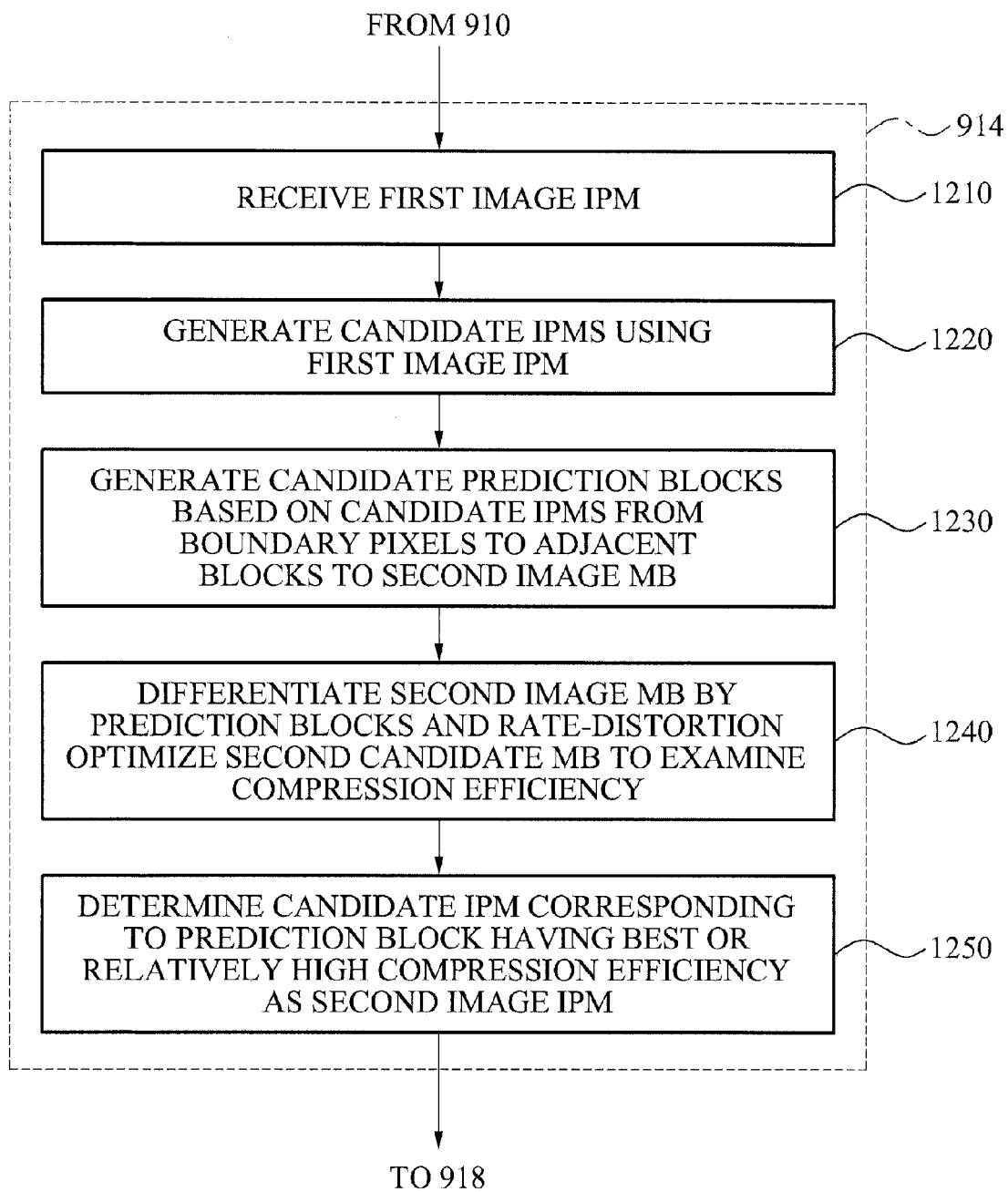
FIG. 12 is a flowchart illustrating another example of generating an intra prediction mode of an image using an intra prediction mode of another image according to example embodiments.

FIG. 12 is a flowchart illustrating another example of generating an IPM of an image using an IPM of another image according to example embodiments.

Referring to FIG. 12, the second compressed information generation unit 122 receives the first image IPM in operation 1210. Then, the second compressed information generation unit 122 generates candidate IPMs using the first image IPM in operation 1220. Here, the candidate IPMs are generated by tilting the first image IPM at a preset angle to the right or left. Here, a weighted value of the boundary pixels of the adjacent blocks may vary based on the preset angle.

The second compressed information generation unit 122 generates candidate prediction blocks according to the candidate IPMs from boundary pixels to adjacent pixels to the second image MB in operation 1230.

The second compressed information generation unit 122 differentiates the second image MB by the candidate prediction blocks and rate-distortion optimizes a differentiation result to examine a compression efficiency in operation 1240.

The second compressed information generation unit 122 determines a candidate IPM corresponding to a prediction block having superior or relatively high compression efficiency as the second image IPM in operation 1250.

When the compressed information is an MV, a process of generating the first image MV and the second image MV will be described below with reference to FIGS. 13 to 16.

Figure 13:
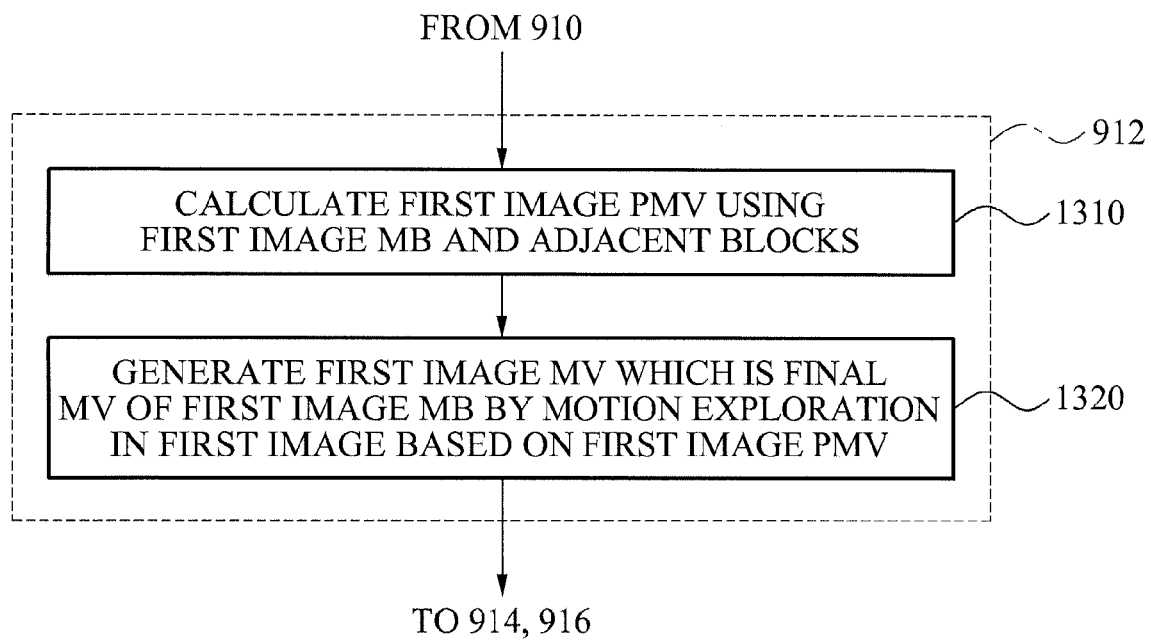
FIG. 13 is a flowchart illustrating a process of generating a motion vector of a color image or a depth image according to example embodiments.

FIG. 13 is a flowchart illustrating a process of generating a motion vector of a color image or a depth image according to example embodiments.

Referring to FIG. 13, the first compressed information generation unit 112 calculates the first image PMV using the first image MB and the adjacent blocks in operation 1310. Here, the first image PMV is a vector obtained by median filter of MVs of left, upper, and upper-right blocks that are the first image MB and the adjacent blocks in horizontal/vertical directions, respectively.

The first compressed information generation unit 112 explores the first image MV that is a final MV of the first image MB by motion exploration in a first image based on the first image PMV in operation 1320.

Figure 14:
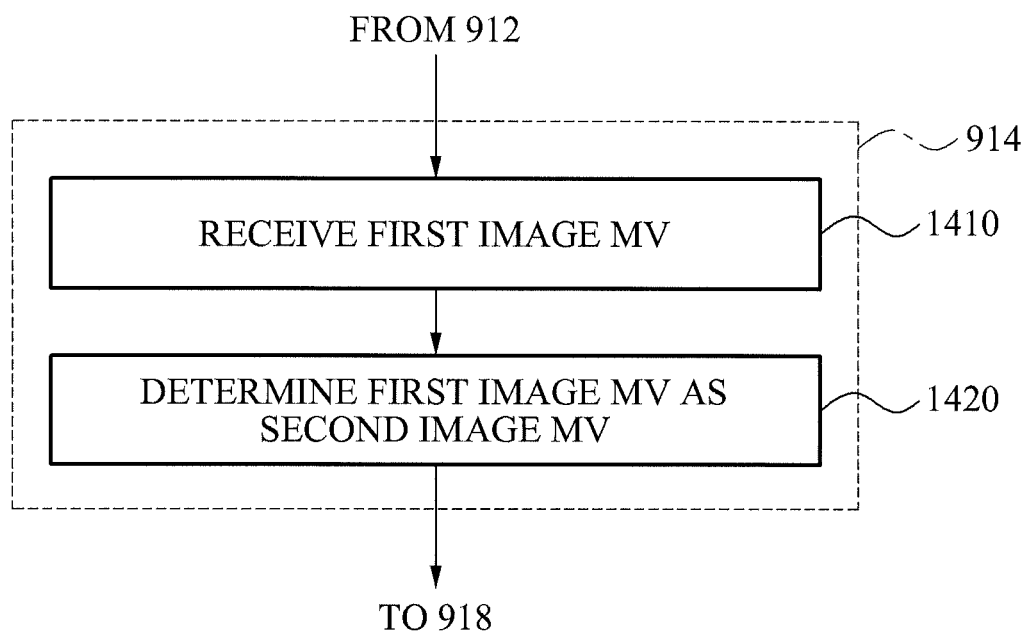
FIG. 14 is a flowchart illustrating an example of generating a motion vector of an image using a motion vector of another image according to example embodiments.

FIG. 14 is a flowchart illustrating an example of generating an MV of an image using an MV of another image according to example embodiments.

Referring to FIG. 14, the second compressed information generation unit 122 receives the first image MV in operation 1410. Then, the second compressed information generation unit 122 determines the first image MV as the second image MV representing an MV of the second image MB in operation 1420.

Figure 15:
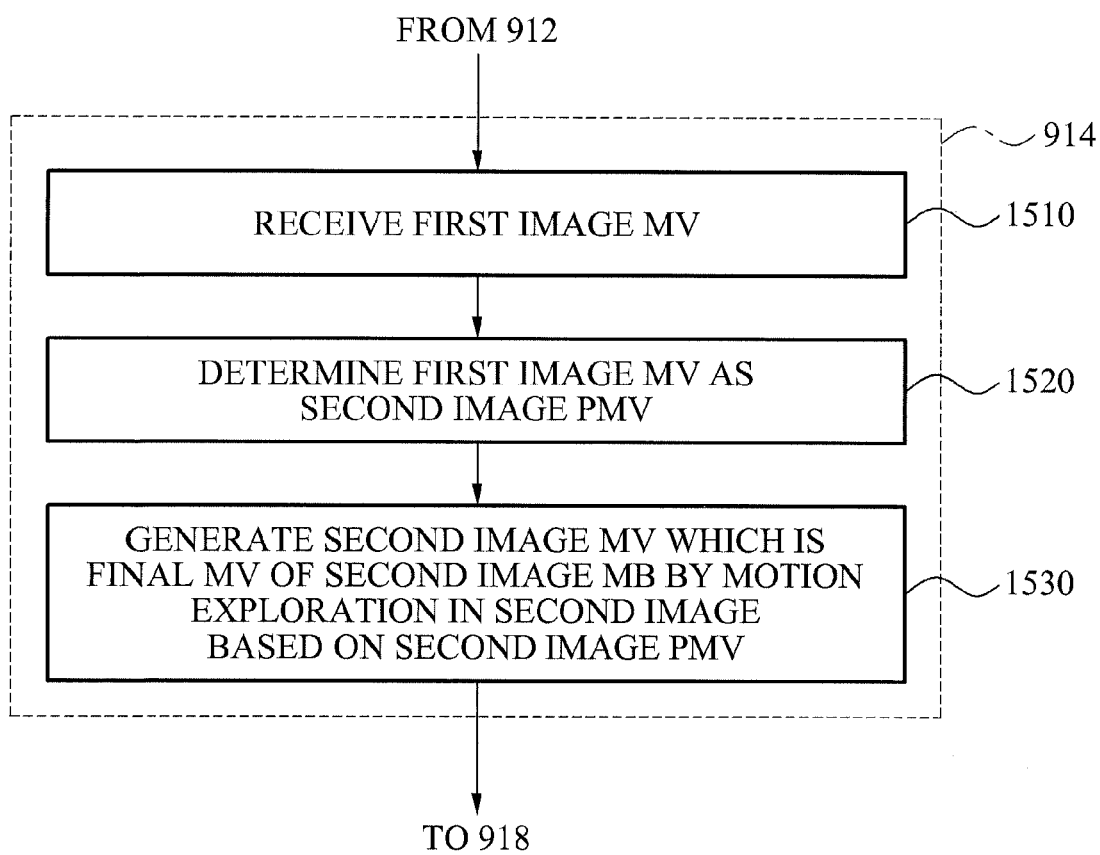
FIG. 15 is a flowchart illustrating another example of generating a motion vector of an image using a motion vector of another image according to example embodiments.

FIG. 15 is a flowchart illustrating another example of generating an MV of an image using an MV of another image according to example embodiments.

Referring to FIG. 15, the second compressed information generation unit 122 receives the first image MV in operation 1510. The second compressed information generation unit 122 determines the first image MV as a second image PMV in operation 1520. The second compressed information generation unit 122 generates the second image MV that is a final MV of the second image MB by motion exploration in a second image based on the second image PMV in operation 1530.

Figure 16:
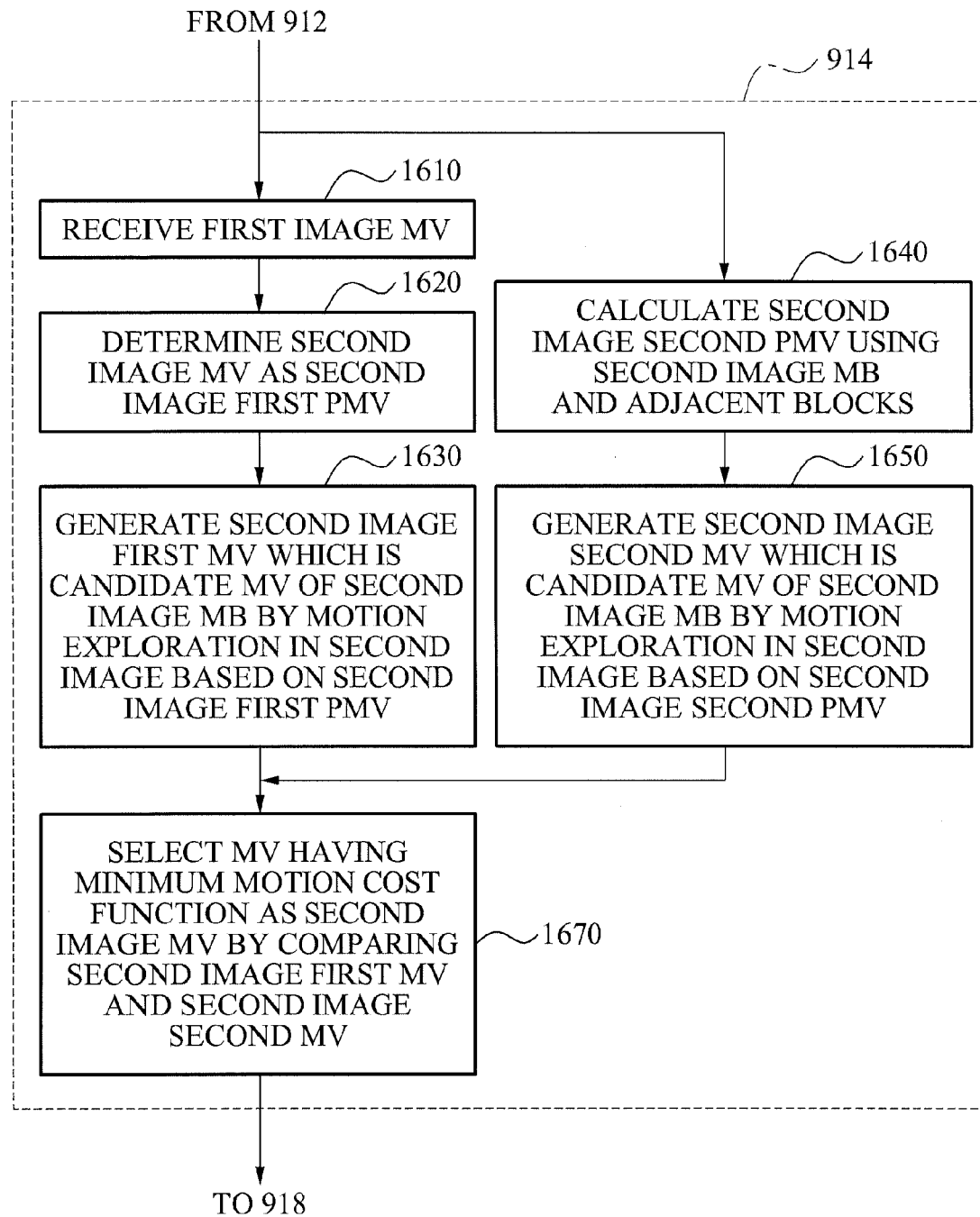
FIG. 16 is a flowchart illustrating still another example of generating a motion vector of an image using a motion vector of another image according to example embodiments.

FIG. 16 is a flowchart illustrating still another example of generating an MV of an image using an MV of another image according to example embodiments.

Referring to FIG. 16, the second compressed information generation unit 122 receives the first image MV in operation 1610. The second compressed information generation unit 122 determines the first image MV as a second image first PMV in operation 1620.

The second compressed information generation unit 122 generates a second image first MV that is a candidate MV of the second image MB by motion exploration in the second image based on the second image first PMV in operation 1630.

The second compressed information generation unit 122 calculates a second image second PMV using the second image MB and the adjacent blocks in operation 1640.

The second compressed information generation unit 122 generates a second image second MV that is an MV of the second image MB by motion exploration in the second image based on the second image second PMV in operation 1650.

The second compressed information generation unit 122 selects an MV having a minimum motion cost function as the second image MV by comparing the second image first MV with the second image second MV.

As described above, there are provided a 3D image encoding apparatus and method which generate first compressed information used to encode one image of two types of images forming a 3D image, and generate second compressed information used to encode another one image using the first compressed information. Since the two images are substantially associated with each other, one image refers to compressed information of the other image to have a relatively higher compression efficiency.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A three-dimensional (3D) image encoding apparatus, the apparatus comprising:
    a first encoder to generate first compressed information in an image macroblock (MB) of a first image which is one of images to form a 3D image, and to encode the image MB of the first image using the first compressed information; and
    a second encoder to generate second compressed information using the first compressed information, and to encode an image MB of a second image which is another one of the images to form the 3D image using the second compressed information,
    wherein the first compressed information is a first image intra prediction mode (IPM) which represents an IPM of the image MB of the first image, and the second compressed information is a second image IPM to represent an IPM of the image MB of the second image.

2. The apparatus of claim 1, wherein the image MB of the first image is one of a color image MB and a depth image MB, and the image MB of the second image is another one of the color image MB and the depth image MB which is different from the image MB of the first image.

3. The apparatus of claim 1, wherein the first encoder comprises a first image intra prediction unit to respectively generate prediction blocks according to IPMs; and a first image IPM determination unit to examine a compression efficiency by differentiating the image MB of the first image by the prediction blocks and rate-distortion optimizing a differentiation result and to determine an IPM having superior or relatively high compression efficiency among the IPMs as the first image IPM.

4. The apparatus of claim 1, wherein the second encoder comprises a second image IPM determination unit to determine the first image IPM as the second image IPM that is the IPM of the image MB of the second image.

5. The apparatus of claim 1, wherein the second encoder comprises:
- a candidate IPM generation unit to generate candidate IPMs using the first image IPM;
- a second image intra prediction unit to respectively generate candidate prediction blocks according to the candidate IPMs and the image MB of the second image; and
- a second image IPM determination unit to examine a compression efficiency by differentiating the image MB of the second image by the candidate prediction blocks and rate-distortion optimizing a differentiation result, and to determine a candidate IPM having superior or relatively high compression efficiency among the candidate IPMs as the second image IPM.

6. The apparatus of claim 1, wherein the first compressed information is a first image motion vector (MV) to represent an MV of the image MB of the first image, and the second compressed information is a second image MV to represent an MV of the image MB of the second image.

7. The apparatus of claim 6, wherein the first encoder comprises a first image predictive MV (PMV) calculation unit to calculate a first image PMV which represents a PMV of the image MB of the first image using the image MB of the first image and adjacent blocks; and a first image motion explorer to generate the first image MV that is a final MV of the image MB of the first image by motion exploration in a first image based on the first image PMV.

8. The apparatus of claim 6, wherein the second encoder comprises a second image MV determination unit to determine the first image MV as the second image MV that is a final MV of the image MB of the second image.

9. The apparatus of claim 6, wherein the second encoder comprises a second image motion explorer to generate the second image MV that is a final MV of the image MB of the second image by motion exploration in a second image based on the first image MV.

10. The apparatus of claim 6, wherein the second encoder comprises:
- a second image first motion explorer to generate a second image first MV which is one of candidate MVs of the image MB of the second image by motion exploration in a second image based on the first image MV;
- a second image PMV calculation unit to calculate a second image PMV which represents a PMV of the image MB of the second image using the image MB block of the second image and adjacent blocks;
- a motion explorer to generate a second image second MV which is one of the candidate MVs of the image MB of the second image by motion exploration in the second image based on the second image PMV; and
- a second image MV selection unit to select an MV having a minimum or relatively low motion cost function as the second image MV by comparing the second image first MV with the second image second MV.

11. A 3D image decoding apparatus, the apparatus comprising:
- a first decoder to decode an encoded image macroblock (MB) of a first image using first compressed information when receiving the encoded image MB of the first image which is one of images to form a 3D image and the first compressed information; and
- a second decoder to generate second compressed information using the first compressed information and to decode an encoded image MB of the second image using the second compressed information when receiving the encoded image MB of a second image which is another one of the images to form the 3D image,
- wherein the first compressed information is a first image IPM to represent an IPM of the image MB of the first image, and the second compressed information is a second image IPM to represent an IPM of the image MB of the second image.

12. The apparatus of claim 11, wherein the image MB of the first image is one of a color image MB and a depth image MB, and the image MB of the second image is another one of the color image MB and the depth image MB which is different from the image MB of the first image.

13. The apparatus of claim 11, wherein the first decoder receives the first image IPM along with the encoded image MB of the first image and decodes the encoded image MB of the first image using the first image IPM.

14. The apparatus of claim 11, wherein the second decoder receives the encoded image MB of the second image and decodes the encoded image MB of the second image using the first image IPM.

15. The apparatus of claim 11, wherein the second decoder receives an index bit along with the encoded image MB of the second image, generates candidate IPMs using the first image IPM, and decodes the encoded image MB of the second image using a candidate IPM corresponding to the index bit among the candidate IPMs as the second image IPM.

16. The apparatus of claim 11, wherein the first compressed information is a first image MV which represents an MV of the image MB of the first image, and the second compressed information is a second image MV which represents an MV of the image MB of the second image.

17. The apparatus of claim 16, wherein the first decoder receives the first image MV along with the encoded image MB of the first image and decodes the encoded image MB of the first image using the image MV of the first image.

18. The apparatus of claim 16, wherein the second decoder receives the encoded image MB of the second image and decodes the encoded image MB of the second image using the first image MV.

19. The apparatus of claim 16, wherein the second decoder receives the encoded image MB of the second image, reconstructs the second image MV using the first image MV as a second image PMV, and decodes the encoded image MB of the second image using the second image MV.

20. The apparatus of claim 16, wherein the second decoder receives the encoded image MB of the second image and an index bit; and the second decoder reconstructs the second image MV using the first image MV as a second image PMV and decodes the encoded image MB of the second image using the second image MV when either the index bit indicates the first image MV is the second image PMV, or the second decoder decodes the encoded image MB of the second image using the second image MV received along with the encoded image MB of the second image when the index bit indicates that the second PMV is calculated through the image MB of the second image.

21. A 3D image encoding method, the method comprising:
generating first compressed information in a image macroblock (MB) of a first image which is one of images to form a 3D image and encoding the image MB of the first image using the first compressed information; and
generating second compressed information using the first compressed information and encoding an image MB of a second image which is another one of the images to form the 3D image using the second compressed information,
wherein the first compressed information is a first image IPM to represent an IPM of the image MB of the first image, and the second compressed information is a second image IPM to represent an IPM of the image MB of the second image.

22. The method of claim 21, wherein the image MB of the first image is one of a color image MB and a depth image MB, and the image MB of the second image is another one of the color image MB and the depth image which is different from the image MB of the first image.

23. The method of claim 21, wherein the generating of the first compressed information comprises:
respectively generating prediction blocks according to IPMs;
examining a compression efficiency by differentiating the image MB of the first image by the prediction blocks and rate-distortion optimizing the image MB of the first image; and
determining an IPM having superior compression efficiency among the IPMs as the first image IPM.

24. The method of claim 21, wherein the generating of the second compressed information comprises determining the first image IPM as the second image IPM that is an IPM of the image MB of the second image.

25. The method of claim 21, wherein the generating of the second compressed information comprises:
generating candidate IPMs using the first image IPM;
respectively generating candidate prediction blocks according to the candidate IPMs;
examining a compression efficiency by differentiating the image MB of the second image by the candidate prediction blocks and rate-distortion optimizing the image MB of the second image; and
determining a candidate IPM having superior or relatively high compression efficiency among the candidate IPMs as the second image IPM.

26. The method of claim 21, wherein the first compressed information is a first image MV which represents an MV of the image MB of the first image, and the second compressed information is a second image MV which represents an MV of the image MB of the second image.

27. The method of claim 26, wherein the generating of the first image PMV that is the first compressed information comprises:
calculating the first image PMV which represents a PMV of the image MB of the first image using the image MB of the first image and adjacent blocks; and
generating the first image MV that is a final MV of the image MB of the first image by motion exploration of a first image.

28. The method of claim 26, wherein the generating of the second image PMV that is the second compressed information comprises determining the first image MV as the second image MV that is a final MV of the image MB of the second image.

29. The method of claim 26, wherein the generating of the second image PMV that is the second compressed information comprises generating the second image MV that is a final MV of the image MB of the second image by motion exploration of a second image based on the first image MV.

30. The method of claim 21, wherein the generating of the second image PMV that is the second compressed information comprises generating a second image first MV which is one of candidate MVs of the image MB of the second image by motion exploration of a second image based on the first image MV;
calculating a second image PMV which represents a PMV of the image MB of the second image using the image MB of the second image and adjacent blocks;
generating a second image second MV which is one of the candidate MVs of the image MB of the second image by motion exploration of the second image based on the second PMV; and
selecting an MV having a minimum or relatively low motion cost function as the second image MV by comparing the second image first MV and the second image second MV.

31. A 3D image decoding method, the method comprising:
receiving an encoded image MB of a first image which is one of images to form a 3D image and a first compressed information;
decoding the encoded image MB of the first image using the first compressed image;
receiving an encoded image MB of a second image which is another one of the images to form the 3D image;
generating second compressed information using the first compressed information; and
decoding the encoded image MB of the second image using the second compressed information,
wherein the first compressed information is a first image IPM to represent an IPM of the image MB of the first image, and the second compressed information is a second image IPM to represent an IPM of the image MB of the second image.

* * * * *

UNITED STATES PATENT AND TRADEMARK OFFICE
CERTIFICATE OF CORRECTION

PATENT NO. : 8,861,874 B2  
APPLICATION NO. : 13/096356  
DATED : October 14, 2014  
INVENTOR(S) : Jin Young Lee et al.

Page 1 of 1

It is certified that error appears in the above-identified patent and that said Letters Patent is hereby corrected as shown below:

In the Claims

Column 15, Line 3, in claim 21, delete "(MB)of" and insert -- (MB) of --, therefor.

Signed and Sealed this
Nineteenth Day of May, 2015

Michelle K. Lee
*Director of the United States Patent and Trademark Office*